UNITED STATES PATENT OFFICE.

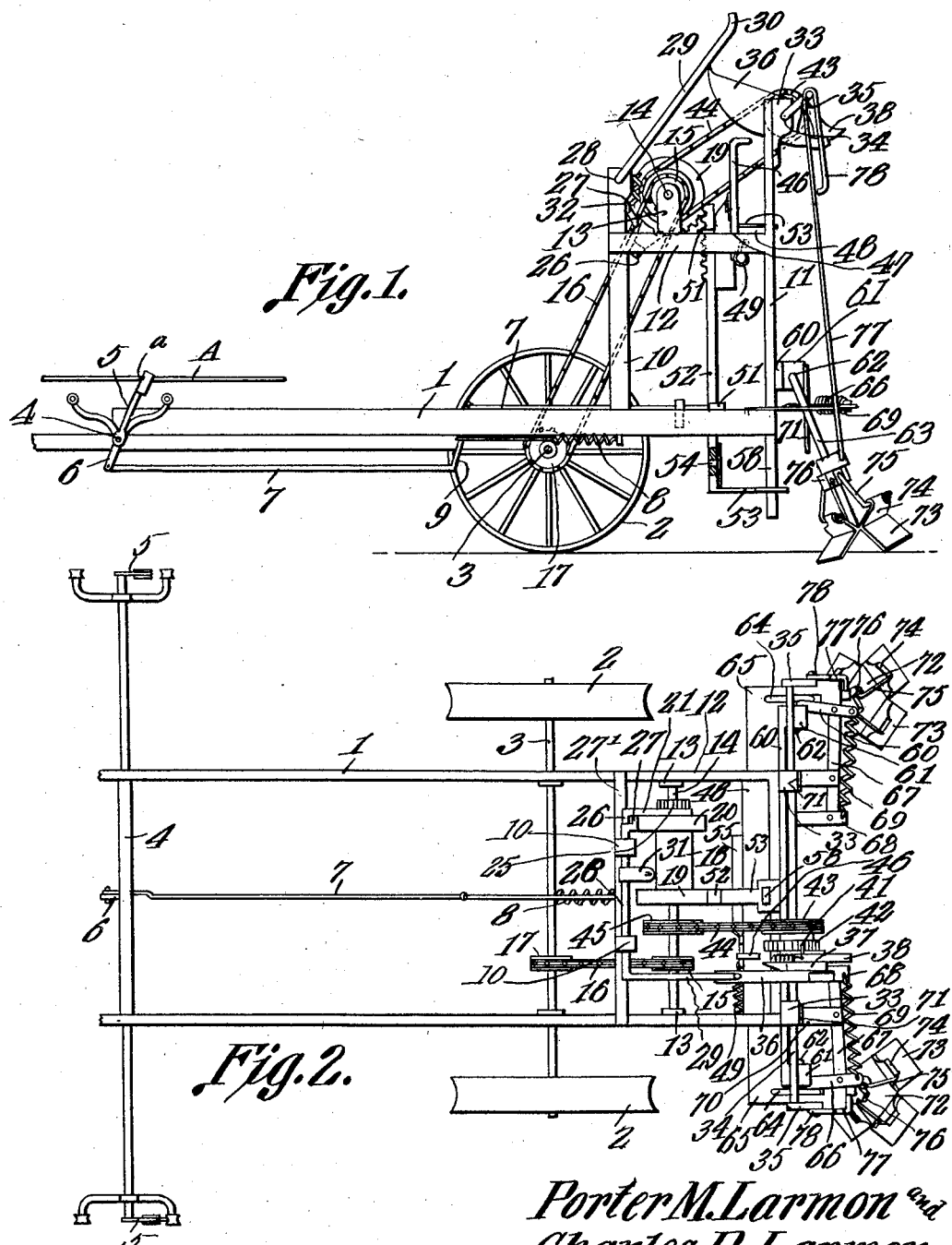

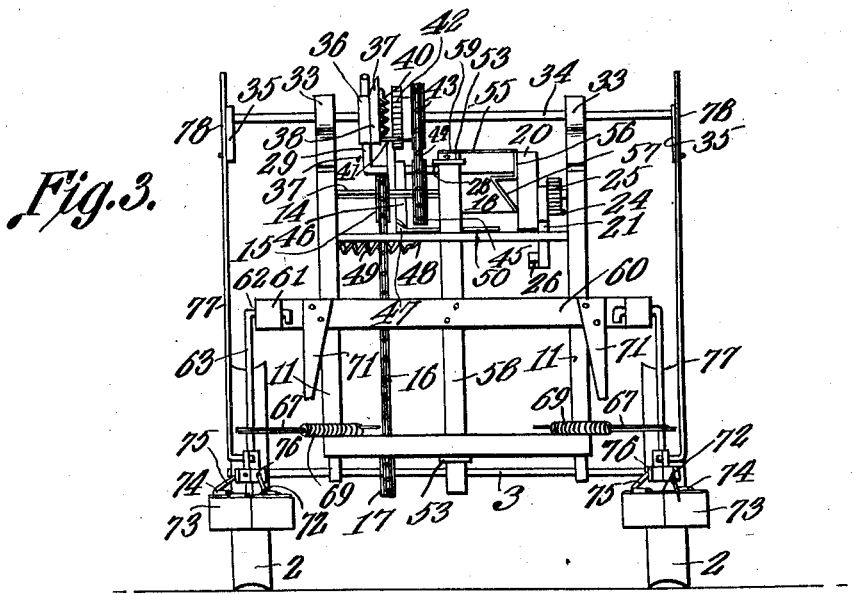

PORTER M. LARMON AND CHARLES R. LARMON, OF ELKTON, KENTUCKY.

HILL-FORMING MECHANISM FOR PLANTERS AND FERTILIZER-DISTRIBUTERS.

1,059,052.  Specification of Letters Patent.  Patented Apr. 15, 1913.

Application filed September 6, 1912. Serial No. 719,000.

*To all whom it may concern:*

Be it known that we, PORTER M. LARMON and CHARLES R. LARMON, citizens of the United States, residing at Elkton, in the county of Todd, State of Kentucky, have invented a new and useful Hill-Forming Mechanism for Planters and Fertilizer-Distributers, of which the following is a specification.

This invention relates to apparatus for forming hills for the reception of seeds or fertilizer, tobacco plants and the like, one of the objects of the invention being to provide means adapted to automatically dig into the soil and to scrape away portions of the soil engaged thereby so as to leave a hill in which plants may be set out or in which seeds or fertilizer may be deposited.

Another object is to provide improved mechanism for operating the said hill forming means, said mechanism being simple and compact.

A further object is to provide means whereby the hill forming elements are free to move relative to the supporting structure so as to compensate for the forward movement of the structure while the said elements are forming the hill.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a side elevation of the mechanism constituting the present invention, the hill forming means being shown in the positions assumed thereby immediately subsequent to the formation of the hill and prior to the return of the parts to their normal positions. Fig. 2 is a plan view. Fig. 3 is a rear elevation, the mechanism being set for use. Fig. 4 is a side elevation of the controlling cam and the adjacent clutch mechanism. Fig. 5 is a perspective view of one of the dogs and the adjacent ratchet wheel used for coupling the segmental gear to its shaft. Fig. 6 is a plan view of the means for locking the hanger against movement, the hanger and the shifting wedge being shown in section.

It is to be understood that the present invention is designed more particularly as an improvement upon the structure shown in an application filed by us on September 28, 1911, Serial No. 651,846.

Referring to the figures by characters of reference 1 designates the frame of the machine, only the rear portion thereof being shown. This frame is adapted to be supported, adjacent its rear end, by wheels 2 carrying an axle 3 which rotates with one or both of them. A rock shaft 4 is journaled on and extends transversely of the frame 1 at a point in advance of the wheels 2 and is provided with means, indicated generally at 5, for engaging the wire A such as commonly used in connection with check row planters. This wire is provided with knots or enlargements *a* at desired intervals so that, as the frame 1 moves forward, the knots or enlargements *a* will intermittently shift the wire engaging means 5 so as thus to rock the shaft 4. This shaft has a central crank arm 6 pivotally connected to a rearwardly extending locking rod 7. A spring 8 is connected to this rod 7 so as to hold it normally drawn rearwardly. The rod may be offset, as shown at 9 so as to enable it to pass over the axle 3. If the rod is thus shaped, the spring is preferably connected to the offset portion as shown. Erected on the frame 1 are standards 10 and 11, the standards 11 being preferably arranged at the rear ends of the sides of frame 1 while the standards 10 are disposed in front of the standards 11. Side strips 12 connect the upper portions of the standards 10 and 11 and are provided with bearings 13 in which is journaled a shaft 14. This shaft has a sprocket 15 secured thereto and which receives motion, through a chain 16, from another sprocket 17 secured to the revoluble axle 3. Thus it will be seen that the shaft 14 is rotated constantly during the forward movement of the machine.

A sleeve 18 is mounted to rotate freely on the shaft 14 and is provided, at one end, with a segmental gear 19. At its other end the sleeve is formed with a head 20 to which is pivotally connected a Y-shaped dog 21, the pivot being indicated at 22. Two arms of this dog straddle the shaft 14 and one of them is connected to the head 20 by a spring 23. This arm has a finger 24 extending laterally from its free end and adapted, when the dog is swung against the stress of spring 23, to move into engagement with a ratchet wheel 25 which is keyed or otherwise secured to the shaft 14. The third arm of the dog 21 has a finger 26 extending laterally therefrom, the two fingers 24 and 26 being extended in opposite directions. This finger 26 normally bears downwardly on a holding arm 27 formed at one end of a releasing shaft 28 which is journaled on a cross strip 27' connecting the upper portions of the standards 10. A rearwardly extending arm 29 extends from shaft 28 and has its free end portion upturned, as shown at 30. A finger 31 also extends rearwardly from shaft 28 and is connected, by means of a spring 32, to the cross strip 27' so as thus to hold the arms 27 and 29 normally swung downwardly.

Journaled in bearings 33 upon the upper end portions of the standards 11, is a transverse shaft 34, provided, at its ends, with crank arms 35. Fixedly secured to this shaft, adjacent one end thereof, is a cam 36 having a guard flange 37 at one side thereof and extending beyond the periphery thereof. This flange is preferably beveled, as shown particularly in Fig. 3, so as to constitute means for deflecting the arm 29 onto the peripheral portion of the cam 36.

A dog 38, preferably substantially Y-shaped is pivotally connected, as at 39, to one side of the cam 36 and two arms of this dog straddle the shaft 34. One of these arms is connected to the cam 36 by a spring 40 and a finger 41 extends laterally from said arm and is adapted to engage a ratchet wheel 42 which is mounted to rotate freely on the shaft 34. The ratchet wheel 42 is formed on or secured to a sprocket wheel 43 and this wheel receives motion, through a chain 44, from a sprocket wheel 45 keyed or otherwise secured to the shaft 14. As shaft 14 is constantly rotating during the movement of the machine, it will be apparent that sprocket 43 is also constantly rotated together with the ratchet wheel 42. In order to prevent the cam 36 from rotating constantly with the ratchet wheel 42, the finger 41 on dog 38 is held out of engagement with the ratchet wheel by means of a stop lever 46 which is fulcrumed, as at 47, upon a cross strip 48 supported by the side strips 12. This lever is held, by a spring 49, normally in the path of one of the arms of dog 38, and a link 50 is pivotally connected to and extends laterally from the lever at a point above the fulcrum thereof.

Mounted within suitable guides in the back portion of frame 1 and upon the cross strip 48, these guides being indicated at 51, is a rack bar 52 having guide plates 53 extending rearwardly from the upper and lower ends thereof and the upper one of which is adapted to bear downwardly on the cross strip 48 so as to limit the downward movement of the rack bar. The teeth of the rack bar are supported in the path of the teeth of the segmental gear 19 when the rack bar 52 is in its lowermost position. An opening 54 is formed in the lower portion of the rack bar and is adapted, when the said bar is elevated to its uppermost position, to receive the end of the locking rod 7 and thus be held against downward movement. The upper guide plate 53 has an arm 55 extending laterally therefrom and provided with a hanger 56 at its outer end. A beveled head 57 is provided at the lower end of the hanger 56 and is adapted, during the downward movement of the rack bar 52, to ride upon the end of link 50 and thus shift it longitudinally so as to swing the lever 46 laterally and out of the path of the dog 38. When, however, the rack bar 52 is moving upwardly, the link 50 which is pivotally connected to the lever 46, will swing upwardly with the head 57 until it is free to slip past it whereupon it will gravitate back to its initial position under the head.

Mounted within the guide plates 53 is a slide 58 having a stop pin 59 extending rearwardly from the upper end portion thereof so as to prevent the slide from being withdrawn downwardly from the guide plates 53. Arms 60 extend laterally from the slide 58 and each of them is provided at its outer end, with an extension 61 in which is mounted an arm 62 extending laterally from the upper end of a hanger 63. Thus it will be seen that these hangers are free to swing backwardly relative to the arms 60 and slide 58. Each hanger 63 extends through a slot 64 formed in a guide plate 65 which, as shown in the drawings, extends rearwardly from one of the standards 11. A holding or retaining dog 66 is pivotally mounted on the slotted guide plate and normally extends partly across the slot so as to prevent the hanger 63 from swinging rearwardly within the slot 64. An arm 67 extends laterally from the dog 66 and is mounted to travel within a guide 68, this guide being connected to one end of the dog 66 by a spring 69. A finger 70 extends forwardly from the arm 67 and into the path of a deflecting wedge or cam 71 extending downwardly from the adjacent arm 60 of slide 58.

Secured to the lower end of each hanger 63 is a block 72 to which scraping blades 73 are hingedly connected. This block is preferably rectangular and one of the scraping blades 73 is pivotally connected to each side thereof. Each scraping blade has a tongue 74 fixed relative thereto and outstanding from the upper edge thereof. These tongues are connected, by links 75, to a slide 76 mounted on the hanger 63. A rod 77 is pivotally connected to the slide 76 and extends upwardly therefrom, this rod being formed at its upper end, with an elongated loop 78 into which projects one of the crank arms 35 hereinbefore referred to.

The operation of the machine is as follows:—Assuming that the dog 21 is in engagement with the arm 27 and thus held out of engagement with the ratchet wheel 25, it will be apparent that shaft 14 will be free to rotate during the forward movement of the machine, motion being transmitted to said shaft through chain 16. Furthermore, as the lever 46 is normally in the path of the dog 38, it will be apparent that the finger 41 will be held out of engagement with ratchet wheel 42 and said wheel, together with sprocket 43, will therefore be free to rotate on the shaft 34, motion being transmitted to said sprocket wheel through chain 44. The rack bar 52 is normally supported in raised position by the locking rod 7 and the teeth of the segmental gear 19 are normally located under the shaft 14 and out of engagement with the rack bar 52. As the rack bar is in raised position, its upper guide plate 53 engages the stop pin 59 and thus holds the slide 58 in elevated position. The wedges 71 are thus supported out of engagement with the fingers 70 and the blades 73 are supported out of contact with the ground. When the machine reaches a point where the mechanism is to be operated, the rock shaft 4 is actuated by means of the mechanism provided for that purpose and thus pulls on rod 7 so as to withdraw it from the opening 54. As the elevated rack bar 52 is out of engagement with the teeth of the segmental gear 19, said rack bar will promptly slide downwardly by gravity and permit corresponding movement of the slide 58. Thus the blades 73, which are closed together, will dig into the soil. It is to be understood that this downward movement of the slide and blades is permitted in view of the fact that the crank arms 35 are engaged by elongated loops 78. The downward movement of the rack bar 52 brings the head 57 against link 50 and thus shifts the holding lever 46 out of the path of the dog 38. Thus spring 40 is brought into play and shifts the dog relative to cam 36 so as to bring finger 41 in engagement with the rotating ratchet wheel 42. Cam 36 is thus coupled to the shaft 34 and proceeds to lift the arm 29 so as to shift the crank arm 27 out of the path of the finger 26. Dog 21 is thus released and the spring 23 pulls the finger 24 into engagement with ratchet wheel 25, thus coupling sleeve 18 and segmental gear 19 to the rotating shaft 14. Before the segmental gear 19 can engage the rack 52 and elevate it, the crank arms 35, which rotate with the shaft 34, pull upwardly on the rods 77 so as to cause the slide 76 to move upwardly along hangers 63. Thus the links 75 pull on the tongues 74 and cause the blades 73 to swing outwardly simultaneously and thus scrape away the dirt from that portion of the soil directly under the block 72. The parts are so timed that immediately upon the completion of this scraping action of blades 73, segmental gear 19 engages the rack bar 52 and proceeds to elevate it. As the stop pin 59 bears upon the upper guide plate 53 of the rack bar 52, it will be apparent that slide 58 and the parts connected thereto will move upwardly with the rack bar, thus lifting the blades 73 out of contact with the ground. The spring 32 returns the crank arm 27 to position to engage the dog 21 upon the completion of one revolution thereof so as to disconnect the segmental gear from the shaft 14 by shifting finger 24 out of engagement with ratchet wheel 25. The locking lever 46 also moves back automatically under the action of spring 49 so as to be engaged by the dog 38 upon the completion of one revolution thereof and thus shift the dog so as to disconnect its finger 41 from the ratchet wheel 42. Thus the parts all become reset so that the operation hereindescribed will be repeated when the shaft 4 is again rocked. As the machine is constantly moving forward during the action of the blades 73 upon the soil, it is necessary, as hereinbefore set forth, to provide means whereby the blades will not drag along the soil with the machine. This dragging action is prevented in the following manner:—As the slide 58 moves downwardly, as hereinbefore described, the wedges 71 engage the fingers 70 and thus shift the dogs 66 away from the slots 64. The hangers 63 are thus free to swing rearwardly as shown in Fig. 1. When the slide moves upwardly back to its initial position, the wedges 71 are withdrawn from engagement with fingers 70 and the springs 69 promptly return the dogs 66 to their initial positions so as to hold the hangers 63 against further swinging movement until the blades are again lowered into engagement with the coil.

What is claimed is:—

1. Hill forming means including hingedly mounted scraping blades normally closed together, means for supporting said blades above the surface of the soil, means for directing the blades into engagement with the soil while closed together, and means for automatically swinging the blades apart while lowered to scrape the soil outwardly from that portion of the soil confined between the blades.

2. Hill forming means including hingedly connected blades normally closed together, means for supporting the blades in elevated position, means for releasing the blades to permit them to gravitate, while closed together, into engagement with the soil, means for automatically swinging the blades away from each other, when lowered, to scrape soil away from that portion of the soil confined between the blades, and means for automatically raising the blades out of engagement with the soil subsequent to their scraping action.

3. Hill forming means including hingedly connected blades, means for locking them in elevated position, said blades being normally closed together, means for releasing the blades to lower them while closed together, into engagement with the soil, means for automatically swinging the blades outwardly relative to each other while lowered to scrape soil away from that portion of the soil confined between the blades, means for automatically elevating the blades subsequent to said scraping action, said blades being adapted to gravitate together when raised.

4. Hill forming mechanism including a movable structure, hangers mounted to swing relative thereto, blades hingedly connected and normally closed together, means for holding the hangers against swinging movement, means for locking the hangers in raised position and with the blades out of engagement with the soil, means for unlocking the hangers to permit the blades to gravitate, while closed together, into engagement with the soil, means for automatically swinging the blades relative to each other to scrape soil outwardly away from the soil confined between the blades, and means for automatically releasing the hangers to permit swinging movement thereof while the blades are in engagement with the soil.

5. Hill forming mechanism including a vertically movable slide, a wheel supported structure on which the slide is mounted, a hanger depending from the slide, hinged blades carried by the hanger, said blades being normally in contact, means for locking the slide in raised position and with the blades out of contact with the soil, means for unlocking the slide to permit the blades to gravitate into contact with the soil, and means operated by one of the supporting wheels for successively swinging the blades outwardly relative to each other and elevating said blades out of contact with the soil.

6. In hill forming mechanism the combination with a wheel supported structure, of a vertically movable slide carried thereby, a hanger depending therefrom and adapted to swing rearwardly relative thereto, hinged blades upon the hanger and normally contacting, means for locking the slide in raised position with the blades out of contact with the soil, means for holding the hanger against swinging movement while raised, means for releasing the slide to permit the blades to gravitate into engagement with the soil, means carried by the slide for releasing the hangers to permit swinging movement thereof when lowered, and wheel operated means for successively swinging the blades outwardly relative to each other and elevating the blades out of contact with the soil.

7. In a hill forming mechanism the combination with a wheel supported structure, of a vertically movable slide carried thereby, a hanger depending therefrom and adapted to swing rearwardly relative thereto, hinged blades upon the hanger and normally contacting, means for locking the slide in raised position with the blades out of contact with the soil, means for holding the hanger against swinging movement while raised, means for releasing the slide to permit the blades to gravitate into engagement with the soil, means carried by the slide for releasing the hangers to permit swinging movement thereof when lowered, and means operated by one of the supporting wheels for successively swinging the blades outwardly relative to each other while in engagement with the soil and for elevating the slide and the blades for engagement by the locking means.

8. The combination with a wheel supported structure, and a slide carried thereby, of a normally stationary crank shaft, a hanger depending from this slide, hinged blades thereon, a slide on the hanger, link connections between the slide and blades, a rod extending from the slide and having an elongated loop engaged by the crank of the shaft, a normally rotating drive element upon said shaft, a second shaft actuated by one of the supporting wheels, means for transmitting motion from said shaft to the drive element on the crank shaft, a segmental gear loosely mounted on the wheel driven shaft, means actuated by said gear for elevating the slide, a cam upon the crank shaft, means for holding the drive element normally uncoupled from the crank shaft, means operated by the slide, when lowered, for permitting the drive element to rotate the crank shaft, means for holding the segmental gear normally disengaged from its shaft, and means operated by the rotating cam for permitting the segmental gear to rotate with its shaft.

In testimony that we claim the foregoing as our own, we have hereto affixed our signatures in the presence of two witnesses.

PORTER M. LARMON.
CHARLIE R. LARMON.

Witnesses:
A. S. PERKINS,
J. H. WHITE.